United States Patent [19]

Hynecek

[11] Patent Number: 4,831,451
[45] Date of Patent: May 16, 1989

[54] HORIZONTAL SCANNER FOR IMAGE SENSOR ARRAYS

[75] Inventor: Jaroslav Hynecek, Richardson, Tex.

[73] Assignee: Texas Instruments Incorporated, Dallas, Tex.

[21] Appl. No.: 33,968

[22] Filed: Apr. 2, 1987

[51] Int. Cl.[4] .............................................. H04N 5/14
[52] U.S. Cl. ........................... 358/213.11; 358/213.22; 358/213.26; 358/213.31
[58] Field of Search ....................... 358/213.11, 213.22, 358/213.15, 213.25–213.27, 213.29, 213.31, 213.12, 213.23, 212; 250/578; 377/60–62

[56] References Cited

U.S. PATENT DOCUMENTS

4,011,402  3/1977  Koike et al. ................. 358/213.31
4,466,018  8/1984  Soneda et al. ................ 358/212

Primary Examiner—L. T. Hix
Assistant Examiner—David M. Gray
Attorney, Agent, or Firm—George L. Craig; James T. Comfort; Melvin Sharp

[57] ABSTRACT

A horizontal scanner (30) is formed on-chip with a sensor array (12). The scanner comprises a plurality of stages (114, 116) that preferably each have only four transistors (132, 122, 140 and 118). In one embodiment, dual sense lines (50, 52) are provided and a clocking scheme is used such that a clock signal ($\phi_1$, $\phi_2$) is used to address one sense line,(50) while resetting the other sense line (52) by means of reset circuitry (32). The scanner (30) of the invention is adaptable to be used with imagers having electronic zooming and planning features, and is further adaptable in use for dual-line readout, three-phase (RGB) readout, and multiple-phase readout applications.

19 Claims, 4 Drawing Sheets

HORIZONTAL SCANNER FOR IMAGE SENSOR ARRAYS

TECHNICAL BACKGROUND

This invention relates in general to image sensor arrays, and more particularly relates to horizontal scanners therefor.

BACKGROUND OF THE INVENTION

Several basic device architectures exist in the art for constructing image sensor arrays. Two of these are the frame-transfer and line-addressed architectures. Devices fabricated according to these architectures generally have a plurality of CCD elements arranged in rows and columns. For each CCD photosite well, an additional well separated by a barrier needs to be fabricated adjacent to the well for receiving the stored charge. Further, pixel density is decreased by the requirements of channel stops and well separation barriers. In some cases, drains are formed in the channel stops to prevent blooming, and this takes up additional area.

Another class of imagers is arranged according to the interline transfer architecture. These devices comprise a plurality of photosites that can be either empty CCD wells or photodiodes. The photosites are separated by columns of CCD elements provided for readout of the signal. The necessity for the CCD columns decreases pixel density. Channel stops and barriers are required since CCD elements are used in the structure, and this further decreases pixel density.

Yet another class of devices uses an X-Y architecture wherein each cell or element is individually addressed in the X and Y direction in order to read it out. Conventional X-Y architectures include charge injection devices (CIDs), MOS transistor devices and, more recently, charge-modulated transistor devices. In the charge injection device, two gates are formed, one connected to a column line and another connected to a row line. CID arrays have long readout leads, and therefore have a large parasitic capacitance. This in turn lowers the dynamic range of the device because of the kTC noise associated with the long, high-capacitance readout lines. Further, since each cell is required to be separately read out, the readout of an entire row of cells takes a long time. The high-density television (HDTV) format requires that the addressing and readout be done within a standard 53.5-microsecond period. Thus, if there are 1000 elements in a row of a CID array, each element in the row must be addressed and read out in 53.5 nanoseconds. This is very difficult to accomplish because of the RC time constant associated with charging up the readout lines. This effectively limits the size of CID image sensor arrays.

MOS transistor arrays have the same problems as CID arrays relative to their long, large-capacitance sense lines. In addition, the charge is not amplified, but is readout directly on the sense lines. Pixel density in these devices is reduced by the requirements of forming either one or two transistors at each photosite for addressing purposes.

Recently, a charge modulated device has been proposed by T. Nakamura, K. Matsumoto et al. in their article "A New MOS Phototransistor Operating in a Non-Destructive Readout Mode," *Japanese Journal of Applied Physics*, Vol. 24, No. 5, pages L323-325 (May, 1985). This proposed sensor array has the same X-Y architecture as the CID and MOS architectures mentioned above, and thus, suffers the same dynamic range and speed problems as the other X-Y addressed architectures.

Concurrently with this application, a new image sensor array architecture is proposed that comprises a plurality of transistor sensor elements arranged in rows and columns. The elements each modulate a voltage signal rather than a current signal. As will be explained in more detail below, each sensor element modulates voltage appearing at its source region responsive to light incident on its gate region. The voltage signal can thereafter be processed to remove any variations due to the nonuniformity in sensor element fabrication, and can be transferred to a buffer such as a CCD register or a simple array of storage capacitors and a shift register.

A new image sensor array architecture has been developed in connection with these new elements whereby voltage signals are stored on respective storage elements during a horizontal blanking period, the voltages being subsequently read out for each row during a respective horizontal readout period. Since an entire row of selected transistor sensor element signals is transferred to respective storage elements at one time, the addressing and readout signals can be allowed to take much longer than where the sensor elements are individually addressed. One structure for storing the sensor data prior to serial readout is based on the CCD register. However, CCD registers introduce a complication in chip fabrication, as a level shift implant for the CCD register wells or barriers is usually required. Further, the CCD register will have possible non-uniformities arising from input well geometry variations. These in turn can cause charge quantity variations and therefore, a pattern noise in the output signal.

One solution of the difficulties with CCD registers is to replace them with conventional N-MOS shift registers. However, conventional shift registers have a large horizontal pitch and are not suited for storing input signals from voltage-modulating devices. They further consume a large amount of power.

A need therefore exists in the industry for a horizontal scanner having a reduced horizontal pitch, and low power consumption. A need has further arisen in the industry for a horizontal scanner that can be adapted to electronic zooming and panning operations.

SUMMARY OF THE INVENTION

One aspect of the invention comprises a horizontal scanner having a plurality of stages. The horizontal scanner is used in conjunction with an array of voltage-modulating sensor elements arranged in columns. The array can comprise a plurality of element rows, or a single row of elements. One stage of the horizontal scanner is provided for each column of array imager elements. A selected element in each column produces a signal varying in response to incident light. A storage element of the column stores at least a portion of the voltage signal. A sense line switch for the column is operable to couple a sense line to the storage element. One stage of the scanner has an output for operating this sense line switch. A prior horizontal scanner stage is coupled to the one stage, and is operable to deliver an operating signal to the one stage. A subsequent scanner stage is coupled to the one stage for receiving the operating signal therefrom.

If the received operating signal is in a predetermined state, the stage will operate the sense line switch in order to connect the storage element to the sense line. The data stored on the storage element is then read out on the sense line.

Another aspect of the invention comprises a horizontal scanner stage for a horizontal scanner. The stage includes an AC coupler for coupling a clock input of the stage to an output thereof, the output operating a respective sense line switch during the excursion of a clock signal. The stage preferably includes a first inverter coupled to the prior scanner stage for receiving an operating signal therefrom. The inverter outputs an inverted operating signal to a second inverter responsive to the clock signal. The second inverter outputs a reinverted operating signal to a switch. The switch is operable to couple the second inverter output to a subsequent stage responsive to the clock signal.

Preferably, the horizontal scanner stage of the invention comprises only four transistors and a capacitor, as opposed to the more usual six-transistor layout. This provides an advantage in that it reduces the horizontal pitch of the scanner.

In operating one embodiment of the invention, a signal from a selected sensor element is stored on the storage element for each column. When the horizontal readout begins, an operating signal is input into the scanner. Each stage of the horizontal scanner propagates the operating signal through to the next stage. After the receipt of the operating signal by the scanner stage, the stage will connect the respective storage element to the sense line.

According to another embodiment of the invention, the scanner is provided with two sense lines and inputs for two clock signals. A first clock signal clocks a plurality of first horizontal scanner stages, and a second clock signal clocks second horizontal scanner stages disposed adjacent respective first stages. This dual clocking allows the advantage of a simple reset as follows. The first and second clock signals are preferably input into the scanner such that they are out of phase with each other. While the first clock signal is clocking the first stages and outputting a voltage signal from one of the respective column storage elements, the first clock signal is also resetting the second sense line. Similarly, the second clock signal clocks the second stages and connects a selected column storage element to the second sense line, but at the same time resets the first sense line.

Since the first and second sense lines are alternately activated, their outputs may be summed to get a single continuous voltage signal output. This presents an additional advantage in that switching noise resulting from switching from one sense line to another is minimized.

According to a further aspect of the invention, the operating signal may be inserted into any selected horizontal scanning stage rather than propagated through the stages serially from the first stage. This allows such operations as electronic zooming and panning. According to this embodiment, a switch is operable to connect an operating signal source to the input of any one selected stage responsive to a received address.

In yet another respect of the invention, the horizontal scanner is adaptable for dual- or multiple-line readout, as could be used in color sensing applications. In this embodiment, the sense line for any one column is connected to two or more storage elements or storage elements through respective transfer gates. A first sensor element in the column is addressed, and a voltage signal therefrom is transferred to a first storage element. Within the same horizontal blanking period, a second sensor element on the same column, but in a different row, is addressed, and the resultant voltage signal is transferred to a second storage element. The first storage element is connected to a first sense line by a first switching transistor, and the second storage element is connected to a second sense line by a second switching transistor. The switching transistors are preferably controlled by adjacent stages in the horizontal scanner. In the readout period following the horizontal blanking period, the voltage signals stored on both storage elements are read out onto respective sense lines. This process is repeated for each column in the array. Therefore, two or more entire rows of sensor elements may be sensed and read out within one horizontal blanking and readout period. Reading out two sensor elements for every column is made possible by the extremely fast parallel readout method of the invention. The above aspect of the invention represents an advantage over conventional structures in that more color information can be read out simultaneously. This aspect of the invention has application for use in accordance with the NTSC (National Television System Committee) color sensing interlaced operation.

As above described, twice as many horizontal scanning stages will be necessary as compared to a standard black-and-white application. Therefore, the scanning process must occur twice as fast. This problem can be remedied by a further advantageous aspect of the invention wherein two operating signal lines are connected from two adjacent stages to two or more pairs of respective sense line switches. In this way, one operating signal will operate two switches at once, with the first of the two switches communicating a respective storage element to the first sense line, and the second of the two switches communicating the second storage element to the second sense line. An adjacent scanner stage operates in a like manner to selectively connect first and second storage elements of a second column to third and fourth sense lines.

A further advantage of the invention is its adaptability to a three-phase scanning system, such as could be employed for color TV applications. In a three-phase embodiment, three phase clock lines are used to actuate connection to respective sense lines. Each phase clock line is further preferably coupled to reset circuitry for another sense line, such that a cyclic read/reset operation is obtained. Other multiphase systems can be similarly devised.

BRIEF DESCRIPTION OF THE DRAWINGS

Reference is now made to the following detailed description taken in conjunction with the appended drawings in which.

DETAILED DESCRIPTION

Figure 1:
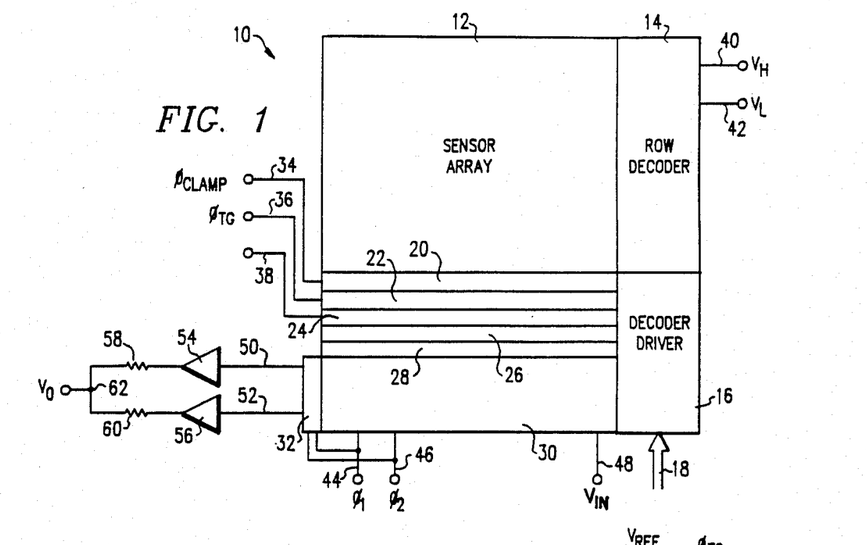
FIG. 1 is a schematic plan view of an imager array incorporating the horizontal scanner of the invention, showing one possible architectural layout on a chip.

Referring first to FIG. 1, one possible on-chip layout of an imager according to the invention is shown. An imager is indicated generally at 10. The largest portion of the area of imager 10 is taken up by a sensor array 12, which preferably comprises a large plurality of sensor elements (described below) arranged in rows and columns. Although an array comprising a plurality of rows is illustrated, the invention is also applicable to an array having a single row of sensor elements, such as a line scanner. A row decoder 14 is disposed adjacent one side of array 12 for decoding a row or vertical address, and selecting a corresponding row of sensor elements. The address to be decoded is received from a decoder driver 16 disposed adjacent row decoder 14. The row address is received by decoder driver 16 on an address bus 18, which preferably has nine bit lines. Other methods can be used to supply the row address. One such is to serially input a nine-pulse address into a demultiplexer, and then output nine row addresses to row decoder 14 in parallel. Another method is to use a vertical shift register in place of the row decoder 14.

A bias transistor area 20 is disposed on a side of array 12 adjacent the side on which row decoder 14 is disposed. Area 20 can be formed either on the bottom of array 12, as shown, or on the top. A coupling capacitor and clamping transistor area 22 is formed adjacent bias area 20. A transfer gate area 24 is formed adjacent capacitor and clamping transistor area 22.

A holding or storage capacitor area 26 is formed adjacent transfer gate area 24. Formed adjacent holding capacitor area 26 is a sense line switching transistor area 28. A horizontal scanner 30 is formed adjacent sense line switch area 28. A reset transistor area 32 is disposed on one side of horizontal scanner 30.

As shown, horizontal scanner 30 must fit within the same horizontal dimension as array 12. In a preferred embodiment, the width of any one column in array 12 is equal to the width of one pixel or element thereof, in general comprising a single transistor having an enclosed geometry. As will be more particularly described below, the scanner 30 is segmented into a plurality of scanner stages. In many embodiments of the invention, it is preferred to apportion one scanner stage to a respective column of sensor elements. It is therefore advantageous to limit the horizontal pitch of each scanner stage to as small an amount as possible.

Imager 10 has several inputs and outputs. A bias terminal 34 supplies bias voltage area 20 with a bias voltage. Clamping transistor area 22 is provided with a clock source $\phi_{clamp}$ via line 36. Transfer gate area 24 is supplied with a transfer gate clock $\phi_{TG}$ via a line 38.

Row decoder 14 is preferably supplied with a high array bias source $V_H$ via line 40, and a low array bias source $V_L$ via line 42. Row decoder 14 preferably operates to connect one selected line to bias source $V_H$ and the remaining non-selected lines to low bias array source $V_L$. A line 44 and a line 46 respectively connect clocks $\phi_1$ and $\phi_2$ to both scanner 30 and reset transistor area 32. Scanner 30 further has an operating signal input 48. A sense line 50 and a sense line 52 are output from reset area 32. Sense line 50 feeds into a buffer 54, and sense line 52 feeds into a buffer 56. The output from buffer 54 is connected to a resistor 58. Likewise, the output of buffer 56 is connected to a resistor 60. Resistors 58 and 60 are connected at a node 62. The output signal appears at a terminal $V_0$. It is preferred that resistors 58 and 60 and terminal $V_0$ be fabricated off-chip. Other terminals, such as power supplies and grounds, are supplied to imager chip 10, but have been omitted as peripheral to the invention.

Figures 2, 3:
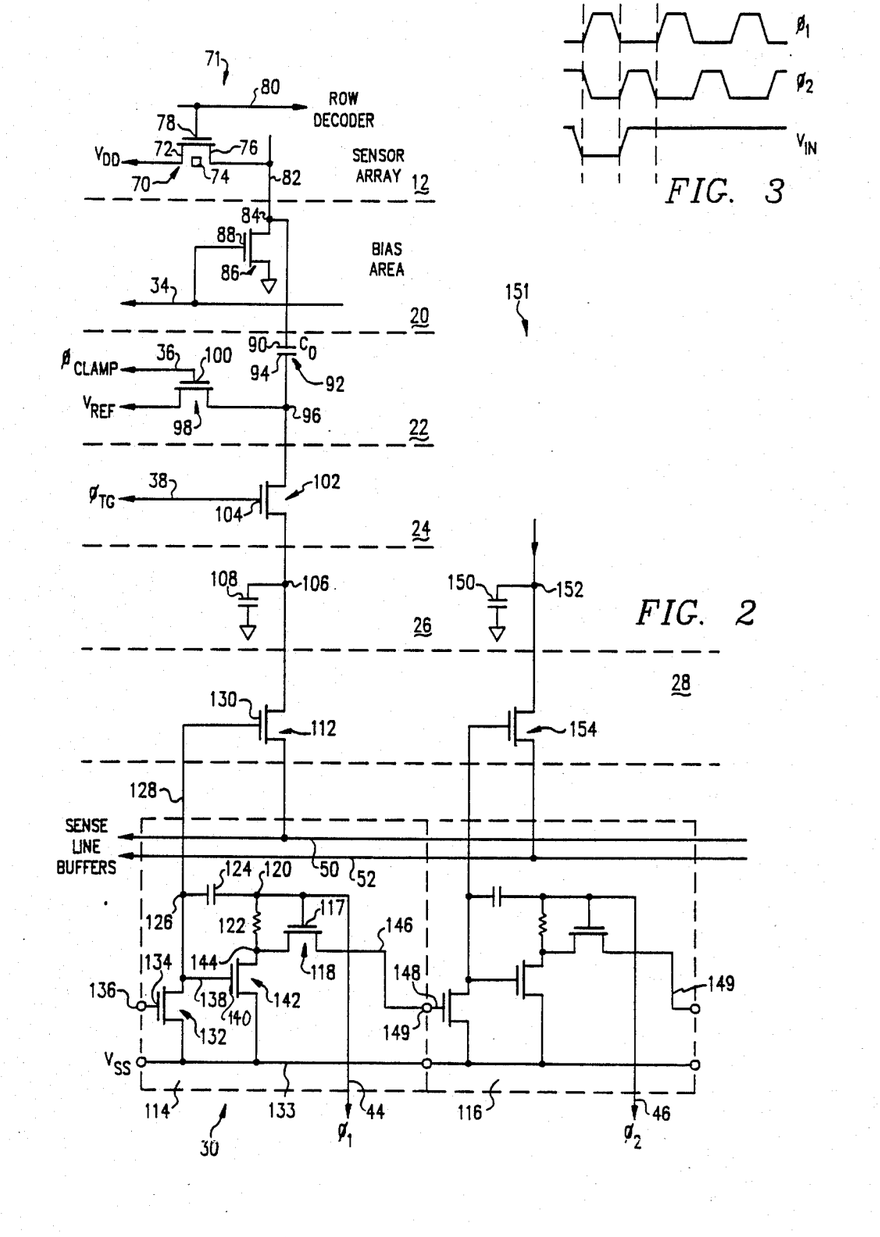
FIG. 2 is a schematic electrical diagram of a small section of the sensor array and horizontal scanner shown in FIG. 1.
FIG. 3 is a timing diagram illustrating the clocking waveforms for use with the circuitry shown in FIGS. 1 and 2.

FIG. 2 is a schematic electrical diagram that illustrates a small portion of imager 10. A selected transistor sensor element in array 12 as indicated generally at 70. Sensor element 70 is formed in a column 71 with like elements. Sensor element 70 has a drain 72 connected to $V_{DD}$, a charge collection region 74, a source 76, and a gate 78. Gate 78 is connected to row decoder 14 (FIG. 1) via a row address line 80. Line 80 also connects to the gates of the other sensor transistors in that row. Source 76 is connected to a column line 82, which also is connected to the sources of the other transistor elements in column 71.

The invention is particularly adapted to a sensor element 70 that modulates a voltage signal output at its source 76. One such type of voltage-modulating sensor element 70 may be fabricated as follows, the process steps for which are however not shown. An (N−) buried channel is implanted into a (P−) semiconductor layer. Two N+ regions are next formed to create drain 72 and source 76. The N+ regions making up drain 72 and source 76 are spaced by charge collection region 74. Region 74 is differentially doped in such a way as to create a partially or completely depleted (P−) potential well for the accumulation of holes responsive to incident light, and an N-type potential well for an electron probing current. The (P−) potential well may be formed by implants of boron, and the probing current well may be formed using phosphorus. The drain regions may be formed in common and may then be connected to $V_{DD}$ by an off-array contact. A transparent insulating layer is formed preferably over the entire semiconductor portion of element 70, and a conductive gate 78 is formed on the insulating layer over region 74. Suitable conductor connections are made to each gate 78 and source 76.

Alternatively, element 70 may comprise a floating gate JFET transistor element. The construction of a JFET element would be similar to the construction of the element as above described, but gate 78 would be omitted. In its place, a capacitor electrode would be formed above a portion of collection region 74 of the semiconductor substrate, and connected to row line 80. No conductor would be formed over the remaining portion of collection region 74.

Referring again to FIG. 2, column line 82 is connected to a node 84 within bias area 20. The current path of a bias transistor 86 connects node 84 to a bias source such as ground. A gate 88 of bias transistor 86 is connected to bias line 34. Node 84 is also connected to the first side 90 of a coupling capacitor indicated generally at 92. A second, opposed electrode 94 of capacitor 92 is connected to a node 96. The current path of a clamping transistor 98 connects node 96 to a voltage reference. A gate 100 of clamping transistor 98 is connected to $\phi_{clamp}$ clock line 36.

Node 96 is further connected to a current path of a transfer gate transistor 102, located in transfer gate area 24. Transistor 102 has a gate 104 connected to a $\phi_{TG}$ clock line 38. The current path of transfer gate transistor 102 connects node 96 to a node 106, located in storage capacitor area 26. Node 106 is connected to a holding or storage capacitor 108, which receives and stores the voltage signal produced by sensor element 70.

The basic operation of the circuit from sensor element 70 to holding capacitor 108 is as follows. Bias transistor 86 is turned on by an appropriate voltage impressed on line 34. Since transistor 86 is relatively small, a small current will flow through its current path, and therefore a small probing current will flow from drain 72 through gate region 74 to source 76. A source voltage will be present at source 76 that corresponds to the gate bias on gate 78 and the intrinsic threshold voltage of the gate region 74.

Charge collection region 74 will accumulate holes in its hole potential well responsive to incident light. The electrons created by the incident light are swept away as a portion of the probing current. The holes, however, accumulate and change the threshold voltage of element 70. This in turn is reflected in the voltage at source 76, and thus at electrode 90 of coupling capacitor 92. After the accumulation of charge in region 74, clamping transistor 98 is turned on by a pulse on line 36, thus impressing a reference voltage $V_{REF}$ on electrode 94. Clamping transistor 98 is subsequently turned off, disconnecting node 96 from $V_{REF}$ and permitting node 96 to float.

Next, a pulse is delivered by row line 80 to element 70, sweeping out the accumulated holes in charge collection region 74. This correspondingly changes the voltage present at source 76, and thus at electrode 90. The voltage across capacitor 92 will however remain the same, and thus, the voltage at electrode 94 and node 96 will change by an amount equivalent to the change in source voltage at source 76. A voltage signal can thus be derived which is proportional to the intensity of the light incident on element 70 only, and which is independent of the intrinsic transistor threshold voltage.

Transfer gate 102 is operated by a pulse $\phi_{TG}$ on line 38 in order to transfer a portion of the charge stored on electrode 94 to holding capacitor 108. The voltage stored on capacitor $C_h$ (108) will be attenuated by a factor of $C_0/C_0+C_h$, where $C_0$ is the capacitance of coupling capacitor 92. It is therefore preferred to make $C_0$ as large as possible in order not to lose too much of the signal. The upper limit on the size of capacitor $C_0$ (92) is related to the charging time permitted by element 70. It should be noted that, as applied to HDTV applications, imager 10 is operated in two alternating phases: a horizontal readout period in which capacitors 108 are read out, and a horizontal blanking period during which voltage signals are produced by transistor elements 70 in a selected row and stored in a plurality of capacitors 108, at least one of which is provided for each column. The size of capacitors 92 and 108 will therefore be related to the length of the horizontal blanking period and the size of element 70.

Node 106 is connected to a first sense line 50 via a sense line switching transistor 112. Transistor 112 is physically located in sense line switching transistor area 28, and is controlled by a respective stage of horizontal scanner 30, as will be described more completely below.

Scanner 30 comprises a plurality of scanner stages that are connected serially to each other. Two stages 114 and 116 are shown in FIG. 2. In the illustrated embodiment, one scanner stage 114 is provided for each column of elements 70.

Scanner stage 114 receives a first clock signal on input line 44. Input line 44 is connected to a gate 117 of a switching transistor 118 and to a node 120. Node 120 is connected to a load resistor 122 and to one electrode of a coupling capacitor 124. The opposing electrode of capacitor 124 is connected to a node 126. Node 126 is connected via a stage output line 128 to a gate 130 of sense line switching transistor 112.

The current path of a transistor 132 connects node 126 to ground, or preferably to a $V_{SS}$ return line 133. Transistor 132 has a gate 134 connected to an operating signal input 136, which is connected to a prior stage (not shown). Where stage 114 is the first one of scanner 30, signal input 136 is connected to operating signal source 48 (FIG. 1).

Node 126 is connected by a line 138 to a gate 140 of an inverting transistor 142. Load resistor 122 connects node 120 to a node 144. The current path of transistor 142 connects node 144 to $V_{SS}$ return line 133 or to ground. Node 144 is further connected by the current path of transistor 118 to an operating signal output line 146. Output line 146 is connected to an operating signal input line 148 of the next stage 116. Stage 116 is identical to stage 114, with the exception that its clocking signal is connected to a $\phi_2$ clock via line 46. Stage 116 has an operating signal output 149.

In the embodiment shown, a holding capacitor 150 is provided for a column 151 adjacent column 71. Holding capacitor 150 is connected to a node 152. A sense line switching transistor 154 is operable to connect node 152 to a second sense line 52.

In operation, clock $\phi_1$ has the dual purpose of propagating an operating signal through stage 114 as well as actuating switching transistor 112 to transfer charge stored on holding capacitor 108 to sense line 50. The operating signal received on line 136 is usually high. In this instance, the clock signal $\phi_1$ received on line 44 is impressed on capacitor 124, but the AC signal resulting therefrom is then shunted to $V_{SS}$ through transistor 132. Therefore, clock signal $\phi_1$ will be unable to operate the gate 130 of switching transistor 112. The voltage signal stored on capacitor 108 will remain intact rather than be transferred to line 50.

The operating signal will nevertheless be propagated through stage 114 by clock pulse $\phi_1$ in the following manner: Since the pulse from capacitor 124 is shunted to $V_{SS}$ through transistor 132, the voltage on line 138 will be low, effectively inverting the operating signal received on line 136. Transistor 142 will therefore be off. Clock line 44 is connected to the drain side of transistor 142 via resistor 122, and therefore node 144 will be high. Clocking signal $\phi_1$ will further be impressed on gate 117 of transistor 118, and thus a high signal will be propagated on output line 146 to input 148.

In the instance that the operating signal received on line 136 is low, transistor 132 will be turned off. The pulse impressed on capacitor 124 by clock signal $\phi_1$ will therefore be operable to turn on transistor 112. Sense line 50 will then receive the voltage signal stored on holding capacitor 108. Since transistor 132 is in this instance off, the voltage on line 138 is high, turning on transistor 142. Therefore, the voltage at node 144 will be low, and this voltage is communicated through transistor 118 to output line 146. A low operating signal is therefore propagated through stage 114 to stage 116.

The scanner stage of one aspect of the invention represents an advantage over conventional structures in that it incorporates only four transistors, if resistor 122 is counted, and one capacitor 124. Resistor 122 can be conveniently formed as a transistor whose gate is shorted to its drain. The stage of this aspect of the invention can be fabricated with less of a horizontal pitch than the more conventional six-transistor structure. A further advantage is derived from the fact that capacitor 124 makes sure that gate 130 is turned on by the leading transition of clock pulse $\phi_1$, and turned off by the trailing edge of clock pulse $\phi_1$. The signal observed on sense line 50 will therefore have a noise component due to clock pulse $\phi_1$, but will exhibit no other switching noise. Since clock pulse $\phi_1$ is the same for each stage 114 connected thereto, it will not contribute to fixed pattern noise.

The operation of stage 116 is similar. If a high operating signal is input on line 148, a high operating signal will be propagated through to output line 149, but transistor 154 will not be turned on. If a low signal appears on input line 148, clock pulse $\phi_2$ will not only propagate the low signal through to output line 149, but will in addition cause transistor 154 to be turned on, communicating the voltage stored on capacitor 150 with second sense line 52.

The scanner stage 114 and 116 shown in FIG. 2 have an additional advantage in that they require no outside power for their operation apart from a beginning operating signal and clock pulses $\phi_1$ and $\phi_2$. Transistor 142 will only draw current from pulse $\phi_1$ when the operating signal is low, and transistor 132 will only draw current from capacitor 124, and therefore pulse $\phi_1$, during pulse transitions. Thus, the power requirements for pulse $\phi_1$ are lessened.

FIG. 3 illustrates the required timing relationships for $\phi_1$, $\phi_2$ and the operating signal $V_{IN}$. Clock pulses $\phi_1$, and $\phi_2$ should be out-of-phase and non-overlapping such that the operating signal will be cleanly propagated through each scanner stage. Operating signal $V_{IN}$ should be wider than $\phi_1$ where it goes low.

Figure 4:
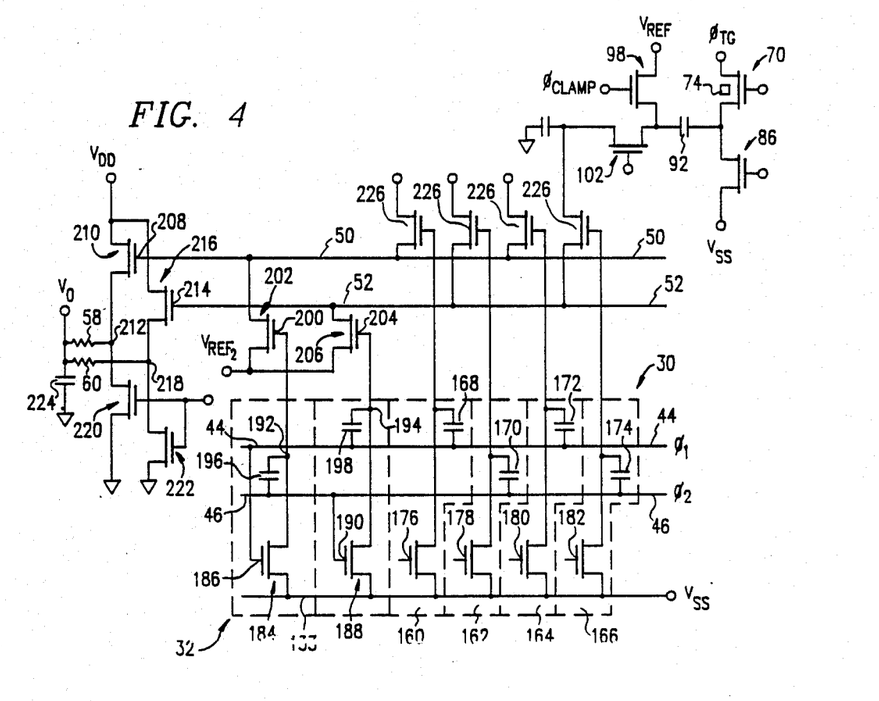
FIG. 4 is a simplified schematic electrical diagram of a section of the horizontal scanner and array of the invention, particularly showing reset and sense line buffer circuitry.

Referring now to FIG. 4, a schematic electrical diagram of a portion of the circuitry of one aspect of the invention is shown, particularly illustrating the reset and buffer sections. Four scanner stages 160-166 are illustrated in abbreviated fashion. Stages 160-166 are the last ones in the scanner and are physically close to reset area 32 (see FIG. 1). Each stage 160-166 has a respective coupling capacitor 168-174 that corresponds to capacitor 124 of stage 114 (FIG. 2). Each stage 160-166 further has a respective first transistor 176-182 that corresponds to transistor 132 of stage 114 (FIG. 2). Stages 160-166 are alternately connected to $\phi_1$ clock line 44 and $\phi_2$ clock line 46.

Sense line reset circuitry is indicated generally at 32, and can be advantageously built using components similar to those used in stages 114, 116 and 160-166. A reset driver transistor 184 has a gate 186 connected to $\phi_1$ clock line 44. Similarly, a reset driver transistor 188 has a gate 190 connected to $\phi_2$ clock line 46. The current path of transistor 184 connects a node 192 to $V_{SS}$ return line 133 and the current path of transistor 188 connects a node 194 to line 133. Transistors 184 and 188 can be constructed to be similar to transistors 132 (FIG. 2) and 176-182.

A capacitor 196 connects node 192 to $\phi_2$ clock line 46. Likewise, a capacitor 198 connects node 194 to clock line 44. Capacitors 196 and 198 can be formed to be similar to capacitors 124 (FIG. 2) and 168-174. By making reset driver transistors 184 and 188 and capacitors 196 and 198 similar to like components in the scanner stages, reset area 32 can be advantageously fabricated on-chip with scanner 30 with no extra process steps. Also, the use of these uniform circuit components allows for feedthrough compensation and cancellation.

In reset area 32, node 192 is further connected to a gate 200 of a first reset transistor 202, and node 194 is connected to a gate 204 of a second reset transistor 206. The current path of transistor 202 connects sense line 50 to $V_{REF2}$, and the current path of transistor 206 connects sense line 52 also to $V_{REF2}$, a voltage reference source.

FIG. 4 illustrates how the dual clocking action provided by clock signals $\phi_1$, and $\phi_2$ can be used to provide the technical advantage of a simple reset mechanism. While $\phi_1$ clock line 44 is transferring a selected voltage signal onto line 50 (see FIG. 2), it also acts to reset the other sense line 52 to $V_{REF2}$. A $\phi_1$ clock pulse is fed in on line 44 to coupling capacitor 198. Capacitor 198 in turn impresses a pulsed voltage signal on gate 204. This operates to turn transistor 206 on, connecting line 52 to $V_{REF2}$. In a similar fashion, clock pulse 46 is operable to reset first sense line 50 while it is transferring a selected voltage signal onto sense line 52.

Since the voltage signals for adjacent sensing transistors 70 are in one embodiment clocked out at alternate times, an additional technical advantage is provided in that the signals can be combined into a single continuous output $V_0$. Sense line 50 terminates in a gate 208 of a first buffer transistor 210, corresponding to buffer 54 in FIG. 1. Buffer transistor 210 is connected to a supply voltage $V_{DD}$. A voltage signal impressed on gate 208 causes a buffered signal to be output at node 212, which is in turn transmitted off-chip to resistor 58 and output terminal $V_0$. Likewise, a voltage signal appearing on line 52 will be impressed on a gate 214 of a second buffer transistor 216. Buffer transistor 216 has a drain that is connected to voltage supply source $V_{DD}$. Buffer transistor 216 acts to buffer the signal impressed on its gate 214, and transfers the buffered signal to node 218, which in turn is connected through resistor 60 to output terminal $V_0$. Buffer transistors 210 and 216 can be formed as large NMOS field-effect transistors. A pair of transistors 220 and 222 are connected to nodes 212 and 218 and are provided as constant current sources to assure a proper bias of transistors 210 and 216. A capacitor 224 can optionally be connected to output $V_0$ to act as a low-pass filter for removing high-frequency harmonics if necessary.

Figure 5:
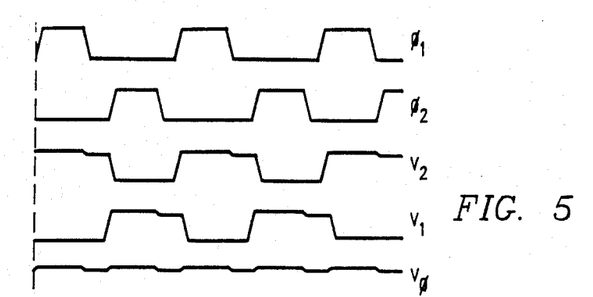
FIG. 5 is a timing diagram showing the operation of the circuit shown in FIG. 4.

Turning now FIG. 5, the summing action of the buffer section shown in FIG. 4 is illustrated by a timing diagram. As previously described, clock pulses $\phi_1$ and $\phi_2$ alternate such that their high states have no overlap. Clock pulses $\phi_1$ and $\phi_2$ cause the generation of voltage signals $V_2$ and $V_1$ on sense lines 50 and 52 (FIG. 4). Signals $V_2$ and $V_1$ are wider than respective clock pulses $\phi_1$ and $\phi_2$, but still will overlap each other only during their transitions. Voltage signals $V_2$ and $V_1$ are summed at $V_0$ as shown. The summing of the two voltage signals on output $V_0$ provides an advantage in that it minimizes video switching noise. The driving of clock $\phi_1$, and $\phi_2$ through capacitors 196 and 198 (FIG. 4) assures a switching noise symmetry for easier cancellation. Further, the use of the summing function of $V_0$ provides a lower clocking frequency for the scanner for a given number of vertical columns in the image sensor.

Conventional output circuitry, such as sample and hold circuits terminating the sense lines and an alternating switch, is avoided.

An additional advantage of the dual sense line approach illustrated by FIG. 4 is lower load capacitance, and thus higher sensitivity. This is because only half of the switching transistors are loading each sense line with their parasitic capacitances.

Figure 6:
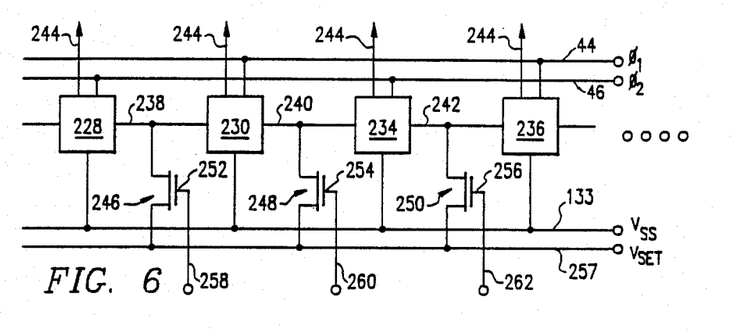
FIG. 6 is a schematic electrical block diagram of an alternate embodiment of a horizontal scanner according to the invention, particularly adapted for electronic zooming and panning.

FIG. 6 shows an embodiment of the invention that enables the operations of electronic zooming and panning. As before, a plurality of scanner stages 228–236 are serially connected by respective operating signal lines 238, 240 and 242. Only four stages are shown for clarity, it being understood that a typical scanner may have as many as 580, 1024, 2048 or more stages. Stages 228 and 235 are connected to $\phi_1$ clock line 44. Alternate, intervening stages 230 and 236 are connected to $\phi_2$ clock line 46. Each stage 228–236 has an output line 244 for activating a respective sense line switching transistor, in turn connecting a respective holding capacitor to one of the two sense lines. In normal operation, the operating signal is propagated from one stage to the other via signal lines 238, 240 and 242. Thus, in the normal manner, one transistor in each column will be sequentially read out on to one of the two sense lines and will appear at $V_0$.

In an electronic zooming operation, only a section of the array is read out. This section of the array may be defined vertically by choosing which rows 80 are addressed by row decoder 14 (FIGS. 1 and 2). The zoomed section may be horizontally defined by choosing which columns will be read out. This is done in the embodiment shown in FIG. 6 as follows. Each operating signal line 238–242 is connected to the drain of a respective operating signal transistor 246–250. Transistors 246–250 each have respective gates 252–256. The current paths of transistors 246–250 connect respective lines 238–242 to a $V_{SET}$ line 257, thus producing a low signal on a respective operating signal line 238–242 when the transistor is operated and $V_{SET}$ is at low bias. Gates 252–256 are connected to respective control lines 258–262, which in turn may be connected to a horizontal decoder.

In order to perform a zooming function, the horizontal decoder will select one of lines 258–262 according to a received horizontal address. A high signal input on, e.g., line 260, will cause the operating signal on line 240 to be pulled to $V_{SET}$. Therefore, stage 234 will receive a low signal if $V_{SET}$ is low, in turn causing a high signal on its respective output line 244 after a clock pulse $\phi_2$ has been applied. This will cause the voltage signal stored on a respective capacitor 108 to be connected to sense line 52 (FIG. 2). The operating signal may be sequentially propagated from stage 234 onward, effectively circumventing the readout of stages 228–230. The other horizontal limit of the columns to be read may be defined by simply stopping the clock pulses $\phi_1$ and $\phi_2$ and setting all of the stages high.

The zoomed section of imager array 12 (FIG. 1) may be panned simply by changing the horizontal address where the low operating signal is inserted. In order to eliminate noise, it is desirable to decode the horizontal position where the operating signal should be inserted, and to set the corresponding register stage to low, during the horizontal blanking interval.

The embodiment shown in FIG. 6 can further be used to set more than one stage 228–236 to "low", thus triggering more than one readout operation at one time. Therefore, sense lines 50 and 52 (FIG. 2) can be read out simultaneously. This embodiment can also simultaneously set any number of desired stages high by pulling $V_{SET}$ high and decoding the appropriate addresses of control lines 258–262.

Figure 7:
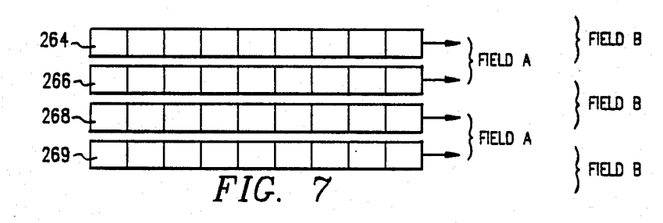
FIG. 7 is a diagram showing dual line readout according to the NTSC standard.

FIG. 7 illustrates the NTSC (National Television System Committee) system of dual line scanning, where two row lines are read out simultaneously as a single field.

In this system, pairs of sensor element rows are read out together in a single field. Thus, in one particular column, the charge accumulated in elements 264 and 266 are read out in a field "A". Next, elements 268 and 269 are read out. This process continues until all of the rows on the array are read out.

The process then begins again at the top of the array, this time reading out overlapping rows of elements in field "B". Thus, a row of elements (not shown) and a row of elements containing element 264, are read out in a field "B", rows containing elements 266 and 268 are read out next, and so on.

Figure 8:
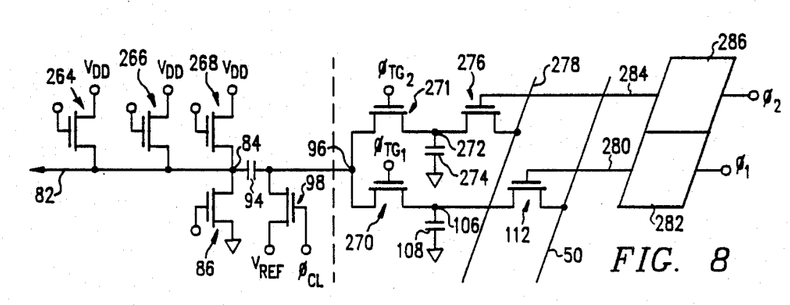
FIG. 8 is an electrical schematic diagram of an alternate embodiment of the invention adapted for dual line readout.

FIG. 8 illustrates an adaptation of the invention that will accomplish dual line scanning. The sensing end of the circuitry schematically shown is substantially the same as that shown in FIG. 2, and like numbers identify like parts. The sources of sensing elements 264, 266 and 268 are connected to a column line 82. A bias transistor 86 is operable to be turned on for providing a probing current through element 70. A coupling capacitor 94 is connected between a node 84 and a node 96. The side of capacitor 94 connected to node 96 is also connected to a clamping transistor 98. A voltage signal from each of a pair of transistors selected from transistors 264, 266 and 268 is sequentially clamped, pending transfers to a respective holding capacitor 106 or 274.

Node 96 is connected through the current path of a transfer gate transistor 270 to a holding or storage capacitor 108, after the manner shown in FIG. 2. However, node 96 is further connected to the current path of a second transfer gate transistor 271. Transistors 270 and 271 have gates controlled by respective transfer gate clock $\phi_{TG1}$ and $\phi_{TG2}$. The current path of transistor 271 connects node 96 to a node 272. A second holding or storage capacitor 274 is connected between node 272 and ground. Node 272 is further connected to the current path of a second sense line switching transistor 276.

As in FIG. 2, a first sense line switching transistor 112 is operable to connect capacitor 108 to a first sense line 50. The second sense line switching transistor 276 is provided to connect node 272 to a second sense line 278. The gate of transistor 112 is connected to a line 280, which serves as an output line from a stage 282. In a like mannner, the gate of transistor 276 is controlled by the voltage on a line 284, which serves as the output from a stage 286 that is preferably adjacent to stage 282. The details of stages 282 and 286 are similar to the stages 114 shown in FIG. 2.

In operation, two selected elements for each column are addressed, one after the other, within a single horizontal blanking period. For example, suppose that it is desired that elements 264 and 266 be read out simultaneously as a portion of field (A). First, the row of elements containing element 264 is addressed. A voltage differential signal therefrom is held at capacitor 94. This voltage differential signal is transferred through transfer gate 270 to capacitor 108.

Subsequently in the same horizontal blanking period, an adjacent row of elements containing element 266 is addressed. The voltage differential signal resulting from this element is held at capacitor 94. This second voltage differential signal is transferred through transfer gate 271 to capacitor 274. Thus, within a single horizontal blanking period, data has been collected from two adjacent elements in each column.

In the following horizontal readout period, scanner stage 282 operates switching transistor 112 in order to transfer the signal stored on capacitor 108 to output line 50. This readout operation is done responsive to a received operating signal and a clock pulse $\phi_1$, as described above. The operating signal is preferably propagated to adjacent stage 286. Stage 286 operates switching transistor 276 responsive to receiving the operating signal and a clock pulse $\phi_2$. The signal stored on holding capacitor 274 will then be read out onto output line 278. In this manner, data from two rows of sensor elements can be read out during one horizontal readout period. This principle can be extended to three or more rows of sensor elements by supplying additional holding capacitors and additional readout lines.

Figure 9:
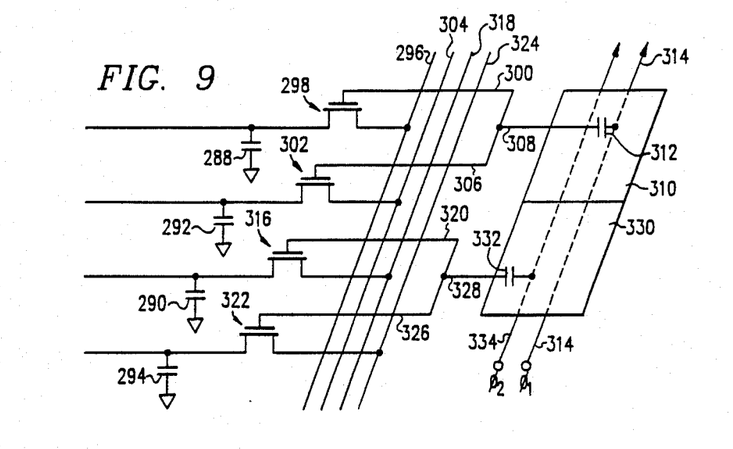
FIG. 9 is an electrical schematic diagram of yet another embodiment of the invention adapted for dual line readout.

It is necessary to operate the horizontal scanner shown in FIG. 8 twice as fast as the scanner shown in FIG. 2. In order to reduce the horizontal frequency requirements of the scanner, it is possible to quadruple the sense lines and connect the readout system as shown in FIG. 9. In this embodiment, a pair of holding or storage capacitors 288 and 290 are provided for a first column of sensor elements (not shown), and a pair of second holding capacitors 292 and 294 are provided for a second column (not shown). Capacitor 288 is connected to a first sense line 296 by the current path of a first sense line switching transistor 298. The gate of transistor 298 is controlled by a line 300. A second sense line switching transistor 302 is operable to connect holding capacitor 292 to a second sene line 304. The gate of transistor 302 is connected to a line 306. Lines 300 and 306 are connected to an output line 308 from a first $\phi_1$ scanner stage 310. Scanner 310 includes a coupling capacitor 312 corresponding to capacitor 124 of stage 114 in FIG. 2. Coupling capacitor 312 connects line 308 to a $\phi_1$ clock line 314.

Capacitor 290 is connected through the current path of a transistor 316 to a third sense line 318. The gate of transistor 316 is connected to a line 320. Capacitor 294 is connected through a current path of a sense line switching transistor 322 to a fourth sense line 324. The gate of transistor 322 is connected to a line 326. Line 320 and line 326 are connected to an output line 328. Line 328 is output from a scanner stage 330 that is preferably adjacent scanner stage 310. A coupling capacitor 332 connects line 328 to a $\phi_2$ clock line 334.

In operation, lines 296 and 304 are read out simultaneously as scanner stage 310 is turned on by a $\phi_1$ clock signal on line 314 and a low signal presented at its operating signal input (not shown). Stage 310 propagates the low signal to adjacent stage 330. Then, sense lines 318 and 324 are simultaneously read out when scanner stage 330 is turned on by $\phi_2$ clock line 334. In this way, the horizontal scanner frequency can be the same as that for the dual read-in embodiment illustrated in FIGS. 2-3.

Figure 10:
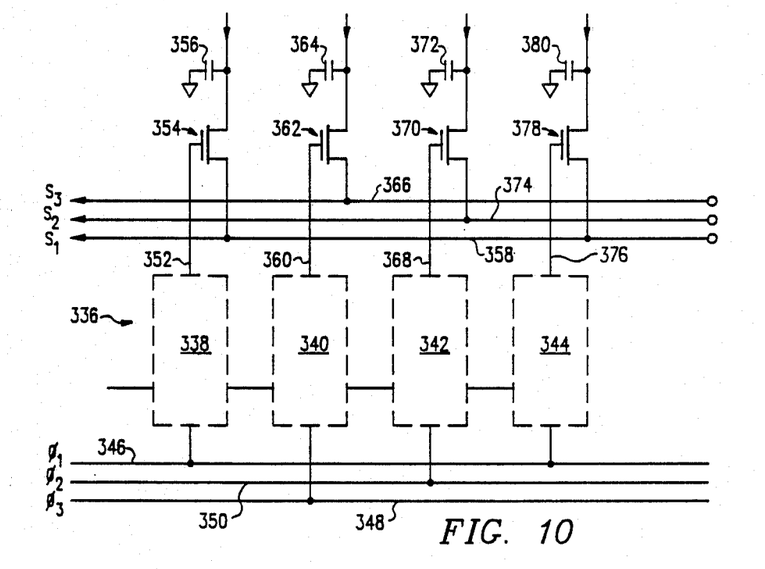
FIG. 10 is an electrical schematic diagram of an embodiment of the invention adapted for three-phase or RGB readout.

Other embodiments of the invention are possible. In FIG. 10, an adaptation of the invention for a 3-phase or RGB color readout is schematically illustrated. In this embodiment, a horizontal scanner indicated generally at 336 includes a plurality of scanner stages 338–344, it being understood that many more scanner stages are included in scanner 336 than the ones shown. Scanner stage 338 is clocked by a $\phi_1$ clock line 346. Scanner stage 340 is clocked by a $\phi_3$ clock line 348. Scanner stage 342 is clocked by a $\phi_2$ clock line 350. Scanner stage 344 is clocked by a $\phi_1$ clock line 346. This pattern is repeated throughout the additional scanner stages.

Output line 352 of scanner stage 338 is connected to the gate of a sense line switching transistor 354. The current path of sense line switching transistor 354 is operable to connect holding capacitor 356 to a first sense line 358. In a similar manner, an output line 360 from scanner stage 340 is connected to the gate of a sense line switching transistor 362. Transistor 362 is operable to connect a holding capacitor 364 to a third sense line 366. An output line 368 from stage 342 is connected to the gate of sense line switching transistor 370. Transistor 370 is operable to connect a storage capacitor 372 to a second sense line 374. An output line 376 from stage 344 is connected to the gate of a sense line switching transistor 378. Transistor 378 is operable to connect a storage capacitor 380 to first sense line 358.

The employment of three phases further allows a cyclic reset of sense lines 358, 366 and 374. As a particular phase clock signal is actuating one connected stage to read out a signal on a respective sense line, it can also be used to reset one or both of the remaining two sense lines. This can be done in a manner similar to the dual line readout and reset arrangement shown in FIG. 4. For 3-phase operation, one possible reset operation would be to have a high signal on $\phi_1$ line 346 act to reset $S_2$ sense line 374 and $S_3$ sense line 366. In a like manner, $\phi_2$ clock signal line 350 would be used to reset $S_3$ sense line 366 and $S_1$ sense line 374, and $\phi_3$ signal line 348 would be used to reset $S_1$ sense line 358 and $S_2$ sense line 366.

Storage capacitors 380 and 356 are operable to store data for a first phase of color readout, such as red. Capacitor 372 is operable to store a voltage signal from a second phase of the readout, such as blue. Finally, capacitor 364 is operable to store data from a third phase of the readout, such as green.

In operation, clock signals $\phi_1$, $\phi_2$ and $\phi_3$ operate to successively clock stages 338, 340, 342, 344, etc., in order to provide RGB readout on lines 358, 374 and 366.

Other embodiments of the invention can be used. For example, if a dual read-in automatic reset feature is desired in conjunction with the three-phase readout system shown in FIG. 10, the sense lines can be doubled to six, and each clock line for one phase can be connected to a reset for a different phase. Other embodiments involving four or more phases can also be constructed.

In summary, a horizontal scanner has been provided that is adapted for use in voltage-modulating transistor image sensor arrays. Since it has only two-thirds as many transistors as conventional horizontal scanners, the scanner of the invention has a horizontal pitch that makes it suitable for fabrication with high-density sensor arrays. Further, the scanner of the invention may be used in conjunction with electronic zooming and panning features, and dual line or RGB readout. Power savings are realized because of the limited number of components turned on in each scanner stage. A novel dual read-in feature and output summing feature are aspects of the invention that provide additional advantages.

While a detailed description of the illustrated embodiments and their advantages has been provided above, the invention is not limited to these embodiments but only by the spirit and scope of the claims which follow.

What is claimed is:

1. A scanner for reading out signals from an array of imager elements arranged in columns, comprising:
    a plurality of scanner stages coupled in series, each stage having an output;
    a storage capacitor connected between a node and a voltage reference for each said column;
    a selected imager element for each column producing a voltage signal varying as a function of light incident on said selected imager element;
    a sampling capacitor coupled to said imager element and selectively coupled to aid node for sampling and holding a portion of said voltage signal, the capacitance of said sampling capacitor chosen to be relatively large with respect to the capacitance of said storage capacitor;
    at least one sense line of said scanner provided for reading out signals from the columns;
    a switching transistor provided for each column operable to couple a respective storage element to said sense line responsive to a clock signal input to a respective stage;
    said respective stage having a first inverter coupled to receive an operating signal from a prior stage, said first inverter outputting an inverted operating signal responsive to said clock signal;
    a second inverter coupled to said first inverter to receive said inverted operating signal, said second inverter outputting said operating signal;
    a switch operably coupling said second inverter to a subsequent stage responsive to said clock signal; and
    an AC coupler operably coupling said clock signal to said output responsive to said first inverter receiving said operating signal of said prior stage.

2. The scanner of claim 1, wherein said coupling capacitor comprises first and second electrodes, a second voltage reference selectively coupled to said second electrode, said first electrode coupled to said selected imager element, said second voltage reference operable to clamp said first electrode at a first time when said voltage signal is present on said first electrode, said second voltage reference isolated from said second electrode at a second time when said voltage signal is no longer present on said first electrode, the voltage on said second electrode dropping by the amount of said voltage signal responsive to the absence of the voltage signal on the first electrode.

3. The scanner of claim 1, and further comprising:
    a port of said respective stage receiving said operating signal from an operating signal source instead of from said prior stage.

4. The scanner of claim 3, and further comprising:
    an operating signal line for said respective stage for transmitting said operating signal from said prior stage to said respective stage, an operating signal switch coupled to said operating signal line for transmitting said operating signal directly to said stage from said operating signal source.

5. The scanner of claim 4, and further comprising:
    an operating signal line for each stage, a respective switch coupled to each operating signal line; and
    a decoder coupled to said operating signal switches for operating a selected one of said switches responsive to receiving an address corresponding to said selected one.

6. The scanner of claim 1, and further comprising first, second and third clock signal lines, said first clock signal line operable to clock a first scanner stage and every third scanner stage thereafter, said second clock signal line operable to clock a plurality of second scanner stages adjacent respective first scanner stages, said third clock signal line operable to clock a plurality of third scanner stages adjacent respective second scanner stages, each scanner stage corresponding to at least one column;
    first, second and third sense lines, a plurality of first sense line switches actuatable by respective first scanner stages for coupling respective storage elements to said first sense line, second sense line switches actuatable by respective second stages for coupling respective storage elements to said second sense line, and third sense line switches actuatable by respective third stages for coupling respective storage elements to said third sense line, such that said scanner may be used for RGB or three-phase applications.

7. The scanner of claim 6, and further comprising:
    a first reset circuit coupled to said first sense line and actuatable by a clock signal line other than said first clock signal to reset said first sense line during the coupling of a storage element to another sense line;
    a second reset circuit coupled to said second sense line and actuatable by a clock signal other than said second clock signal to reset said second sense line when another of said sense lines is coupled to a storage element; and
    a third reset circuit coupled to said third sense line and actuatable by a clock signal other than said third clock signal to reset said third sense line during the coupling of another of said sense lines to a storage element, such that the sense lines may be coupled to a selected storage element and then reset in a cyclic manner.

8. A scanner for reading out signals from an imager array of imager elements arranged in columns, comprising:
    a plurality of first and second scanner stages alternately coupled in series, each stage having an output;
    each column provided with first and second storage elements selectively coupled to a column line for said column, a first sense line of said scanner provided for reading out signals stored on said first element, a second sense line of said scanner provided for reading out signals from said second storage element;
    a first sense line switch provided for said first storage element and actuatable by a first scanner stage for coupling said first storage element to said first sense line responsive to a first stage output;

a second sense line switch provided for coupling said second storage element to said second sense line responsive to a respective second stage output;

each stage coupled to a prior stage and to a subsequent stage, said each stage operable to propagate an operating signal from said prior stage to said subsequent stage responsive to receiving a clock signal, said each stage operating a respective sense line switch responsive to receiving an operating signal having a predetermined state;

a plurality of sensor elements coupled to said column line, a first signal from a first of said sensor elements stored on said first storage element, a second signal from a second of said storage elements different from said first signal stored on said second storage element;

said second stages having clock inputs for receiving a second clock signal, receipt of a second clock signal causing said second stage to operate a respective second sense line switch at a time different from the operation of said first sense line switch, such that signals from two elements in each column may be stored and then read out in a single readout period.

9. A scanner for reading out signals from an imager array of imager elements arranged in columns, comprising:

a plurality of scanner stages coupled in series, each stage having an output;

each column provided with at least first and second storage elements, a column line for each column connected to the imager elements of said column, each storage element provided for storing a signal from a selected imager elements in said column, said first storage element operable to store a signal from a first of said imager elements, said second storage element operable to store a signal from a second of said imager elements;

a plurality of sense lines provided for said scanner, first and second sense line switches for coupling the storage elements of a first column to first and second sense lines;

a scanner stage having an output operable to actuate said first and second sense line switches to couple said first and second storage elements to said first and second sense lines responsive to receiving an operating signal of a predetermined state;

each scanner stage coupled to a prior stage and to a subsequent stage, said each stage operable to propagate an operating signal from said prior stage to said subsequent stage responsive to receiving a clock signal, said each stage operating respective sense line switches responsive to receiving an operating signal having said predetermined state, such that said scanner is adaptable for reading out color information without doubling the frequency of said scanner.

10. Apparatus for detecting light, comprising:

a sensor circuit for producing a voltage signal varying in response to incident light;

means coupled to said sensor circuit for storing at least a portion of said voltage signal;

a sense line, means operable to couple said means for storing said voltage signal portion to said sense line;

a scanner comprising a plurality of stages, one stage having an output for operating said means for coupling, a prior stage coupled to said one stage for delivering an operating signal thereto;

a subsequent stage coupled to said one stage for receiving said operating signal therefrom;

said one stage having a clock input, said one stage operable to propagate said operating signal from said previous stage to said subsequent stage upon receiving a clock signal on said clock input, said one stage operating said sense line switch responsive to receiving a predetermined state of said operating signal and receiving said clock signal.

11. A horizontal scanner for scanning a plurality of columns of sensor elements in an imager array, comprising:

a plurality of scanner stages of said horizontal scanner coupled in series, each stage provided for a respective column;

first ones of said stages coupled to a terminal for a first clock signal, second ones of said stages alternating with said first ones and coupled to a terminal for a second clock signal;

said first ones each operable to couple a respective column to a first sense line, said second ones each operable to couple a respective column to a second sense line;

first and second clock signals respectively input on said first and second clock signal terminals;

said first clock signal actuating a selected first one of said stages to switch a sensor signal from a respective column to said first sense line, said second clock signal actuating a selected second one of said stages to switch a sensor signal from a respective column to said second sense line;

respective first and second reset circuits provided for said first and second sense lines, said first clock signal actuating said second reset circuit to reset said second sense line during the switching of a sensor signal to said first sense line, said second clock signal acuating said first reset circuit to reset said first clock line during the switching of a sensor signal to said second sense line.

12. The scanner of claim 11, wherein said first and second clock signals are out of phase with respect to each other, the scanner further including a summer coupled to terminals of said first and second sense lines for summing signals received from said first and second sense lines.

13. The scanner of claim 12, wherein said summer includes a low pass filter for removing high frequency harmonics.

14. The scanner of claim 11, and further comprising:

a first reset switch for resetting the first sense line to a voltage reference, a second reset switch for resetting the second sense line to said voltage reference;

a first reset switch driver for operating said first reset switch, said first reset switch driver comprising an AC coupling element coupling said second clock signal terminal to said first reset switch and a grounding switch operable by said first clock signal to turn off said reset switch; and a second reset switch driver for operating said second reset switch, said second reset switch driver comprising an AC coupling element coupling said first clock signal terminal to said second reset switch and a grounding switch operable by said second clock signal to turn off said second reset switch.

15. The scanner of claim 14, wherein each stage includes a first transistor receiving an operating signal from a prior stage, an AC coupling element of each said stage for coupling said respective clock signal to a control line for actuating a sense line switch to couple a respective column to a respective sense line;

the AC coupling element of each reset switch driver similar to said stage AC coupling element, said grounding switches similar to said first stage transistor.

16. A stage of a horizontal scanner for reading out an array of elements comprising:

a first transistor, a first gate of said first transistor for receiving an operating signal from a prior stage;

a first node, a current path of said first transistor operable to connect said first node to a reference voltage upon said first gate receiving on operating signal of a first state;

an output line and a coupling capacitor connected to said first node;

a storage element for storing a voltage signal from a selected array element, a sense line, a sense line switch having a current path for connecting said storage element to said sense line, a gate of said sense line switch connected to said output line, a pulse signal from said coupling capacitor operating said sense line switch gate responsive to said first gate receiving an operating signal of a second state;

a second transistor, a gate of said second transistor connected to said first node for receiving an inverted operating signal, said second transistor outputting a reinverted operating signal; and a third transistor for receiving said reinverted operating signal, said third transistor having a third gate coupled to a clock signal line and a current path for transmitting said reinverted operating signal to an operating signal output of said stage responsive to said third gate receiving a clock signal.

17. A method for outputting signals from an array comprising a plurality of elements arranged in columns, comprising the steps of:

for each of a plurality of selected array elements, storing a voltage signal from the array element on a storage element;

inputting an operating signal into a horizontal scanner comprising a plurality of scanner stages, each stage corresponding to a respective column;

propagating the operating signal through successive scanner stages;

for each stage, connecting a respective column to a sense line responsive to said operating signal;

propagating the operating signal and connecting the column responsive to at least one clock signal;

for each stage, impressing the clock signal on an AC coupling element;

delivering an AC signal from the AC coupling element to a sense line switch responsive to receiving the operating signal;

closing a sense line switch between the respective storage element and the sense line responsive to the AC signal;

clocking a plurality of first horizontal scanner stages with a first clock signal at a first time;

clocking a plurality of second scanner stages adjacent said first scanner stages with a second clock signal at a second time;

clocking a plurality of third scanner stages adjacent said second scanner stages with a third clock signal at a third time;

connecting a selected first storage element corresponding to a selected first scanner stage to the first sense line responsive to the selected first scanner stage receiving the operating signal;

connecting a selected second storage element corresponding to a selected second scanner stage to a second sense line responsive to the selected second stage receiving the operating signal;

connecting a selected third storage element corresponding to a selected third scanner stage to a third sense line responsive to the selected third stage receiving the operating signal;

resetting at least the first sense line using a clock signal other than the first clock signal during the connecting of a selected storage element other than a first storage element to another sense line;

resetting at least the second sense line using a clock signal other than the second clock signal during the connecting of another sense line to another selected storage element; and resetting at least the third sense line using a clock signal other than the third clock signal during the connecting of another sense line with a selected other storage element.

18. The method of claim 17, and further comprising the steps of:

inputting an operating signal into a first stage of the scanner, the operating signal having a first state for operating the first stage and a second state for not operating the first stage;

inputting a clock signal into the first stage;

shorting the clock signal to a voltage reference responsive to the operating signal being in the second state;

impressing a signal on the gate of a sense line switching transistor responsive to the operating signal being in the first state;

twice inverting the operating signal using the clock signal; and using the clocking signal to actuate a transfer switch for transferring the twice-inverted operating signal to a next stage.

19. The method of claim 18, and further including the steps of:

impressing the clock signal on an AC coupling element of the first stage;

producing a pulsed signal from the AC coupling element;

shorting the pulsed signal to a voltage reference responsive to the operating signal being in the second stage; and impressing the pulsed signal on a gate of the sense line switching transistor responsive to the operating signal being in the first state.

* * * * *